United States Patent
Fiszer et al.

(10) Patent No.: US 12,367,674 B2
(45) Date of Patent: Jul. 22, 2025

(54) CONTEXT BASED CALL STATUS TRACKING FOR RELEVANT DISPATCH CALL PARTICIPANTS

(71) Applicant: MOTOROLA SOLUTIONS, INC., Chicago, IL (US)

(72) Inventors: Piotr Fiszer, Czestochowa (PL); Andrzej Bukowski, Tarnobrzeg (PL); Marcin Kustra, Cracow (PL); Mateusz Smetek, Skala (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 332 days.

(21) Appl. No.: 18/040,786

(22) PCT Filed: Sep. 7, 2020

(86) PCT No.: PCT/PL2020/050062
§ 371 (c)(1),
(2) Date: Feb. 6, 2023

(87) PCT Pub. No.: WO2022/050856
PCT Pub. Date: Mar. 10, 2022

(65) Prior Publication Data
US 2023/0334858 A1    Oct. 19, 2023

(51) Int. Cl.
*G06V 20/40* (2022.01)
*G06T 11/00* (2006.01)
(Continued)

(52) U.S. Cl.
CPC .............. *G06V 20/41* (2022.01); *G06T 11/00* (2013.01); *G10L 15/1815* (2013.01); *G10L 25/57* (2013.01); *H04L 65/4061* (2013.01)

(58) Field of Classification Search
CPC ........ G06V 20/41; G06V 20/40; G06T 11/00; G10L 15/1815; G10L 25/57; H04L 65/4061
See application file for complete search history.

(56) References Cited

U.S. PATENT DOCUMENTS

| | | | |
|---|---|---|---|
| 6,243,448 | B1 | 6/2001 | Corbett et al. |
| 8,315,673 | B2 | 11/2012 | Gum |

(Continued)

FOREIGN PATENT DOCUMENTS

| | | |
|---|---|---|
| CN | 103856762 A | 6/2014 |
| JP | 2006345400 A | 12/2006 |

(Continued)

OTHER PUBLICATIONS

International Search Report and Written Opinion for Related Application No. PCT/PL2020/050062 dated May 21, 2021 (13 pages).

*Primary Examiner* — Olisa Anwah
(74) *Attorney, Agent, or Firm* — Michael Best & Friedrich LLP

(57) ABSTRACT

Systems and methods for indicating call status for relevant dispatch call participants. One example method includes receiving a voice communication associated with a talkgroup having a plurality of participants, determining context information for the participants from the voice communication, and selecting a relevant participant based on the context information. The method includes receiving a plurality of video streams, at least one of which includes an image of one of the participants. The method includes, for each of the video streams, when the video stream includes an image of the relevant participant, augmenting the video stream to include a highlighted image of the relevant participant, and assigning a priority based on the highlighted image and the context information. The method includes selecting a video stream including the highlighted image of the relevant (Continued)

participant based on the priorities assigned to the video streams and presenting the video stream on a display.

18 Claims, 7 Drawing Sheets

(51) Int. Cl.
*G10L 15/18* (2013.01)
*G10L 25/57* (2013.01)
*H04L 65/4061* (2022.01)

(56) References Cited

U.S. PATENT DOCUMENTS

| | | |
|---|---|---|
| 8,774,596 B2 | 7/2014 | Kurupacheril et al. |
| 9,015,594 B2 * | 4/2015 | Dailey ................. H04M 3/5116 |
| | | 715/736 |
| 9,167,176 B2 | 10/2015 | Winter et al. |
| 10,297,287 B2 | 5/2019 | Maisenbacher et al. |
| 10,313,529 B1 * | 6/2019 | Lee ......................... G10L 17/26 |
| 10,349,235 B2 | 7/2019 | Oh et al. |
| 10,356,369 B2 | 7/2019 | Yokomitsu et al. |
| 10,440,325 B1 | 10/2019 | Boxwell et al. |
| 12,184,803 B2 * | 12/2024 | Horelik ............... H04M 3/5133 |
| 2005/0243167 A1 | 11/2005 | Clarke et al. |
| 2007/0188559 A1 | 8/2007 | Imanaka et al. |
| 2010/0033580 A1 * | 2/2010 | Shaffer ............... H04N 21/4524 |
| | | 348/192 |
| 2010/0157973 A1 | 6/2010 | Bekiares et al. |
| 2013/0271559 A1 | 10/2013 | Feng et al. |
| 2014/0179361 A1 | 6/2014 | Kotreka et al. |
| 2016/0127695 A1 | 5/2016 | Zhang et al. |
| 2017/0099455 A1 * | 4/2017 | Mazzarella ............. H04W 4/10 |
| 2017/0124505 A1 * | 5/2017 | Nakfour ................. H04W 4/90 |
| 2017/0142316 A1 * | 5/2017 | Bohlander ............ G06F 16/735 |
| 2017/0208355 A1 | 7/2017 | Bogucki et al. |
| 2018/0115591 A1 | 4/2018 | Bayley et al. |
| 2018/0174430 A1 * | 6/2018 | Sieja ................... G08B 21/0453 |
| 2019/0222698 A1 * | 7/2019 | Musik ................... G06F 16/638 |
| 2019/0268566 A1 | 8/2019 | Firpo et al. |
| 2019/0392592 A1 * | 12/2019 | Tian ....................... H04W 64/00 |
| 2020/0145774 A1 | 5/2020 | May et al. |
| 2020/0204848 A1 | 6/2020 | Johnson et al. |
| 2020/0329348 A1 * | 10/2020 | Halun ..................... H04W 4/08 |
| 2021/0286980 A1 * | 9/2021 | Stawiszynski ......... H04N 23/53 |
| 2022/0078281 A1 * | 3/2022 | Lindenau ............... H04N 7/181 |

FOREIGN PATENT DOCUMENTS

| | | |
|---|---|---|
| JP | 4306017 B2 | 7/2009 |
| JP | 2011009915 A | 1/2011 |

* cited by examiner

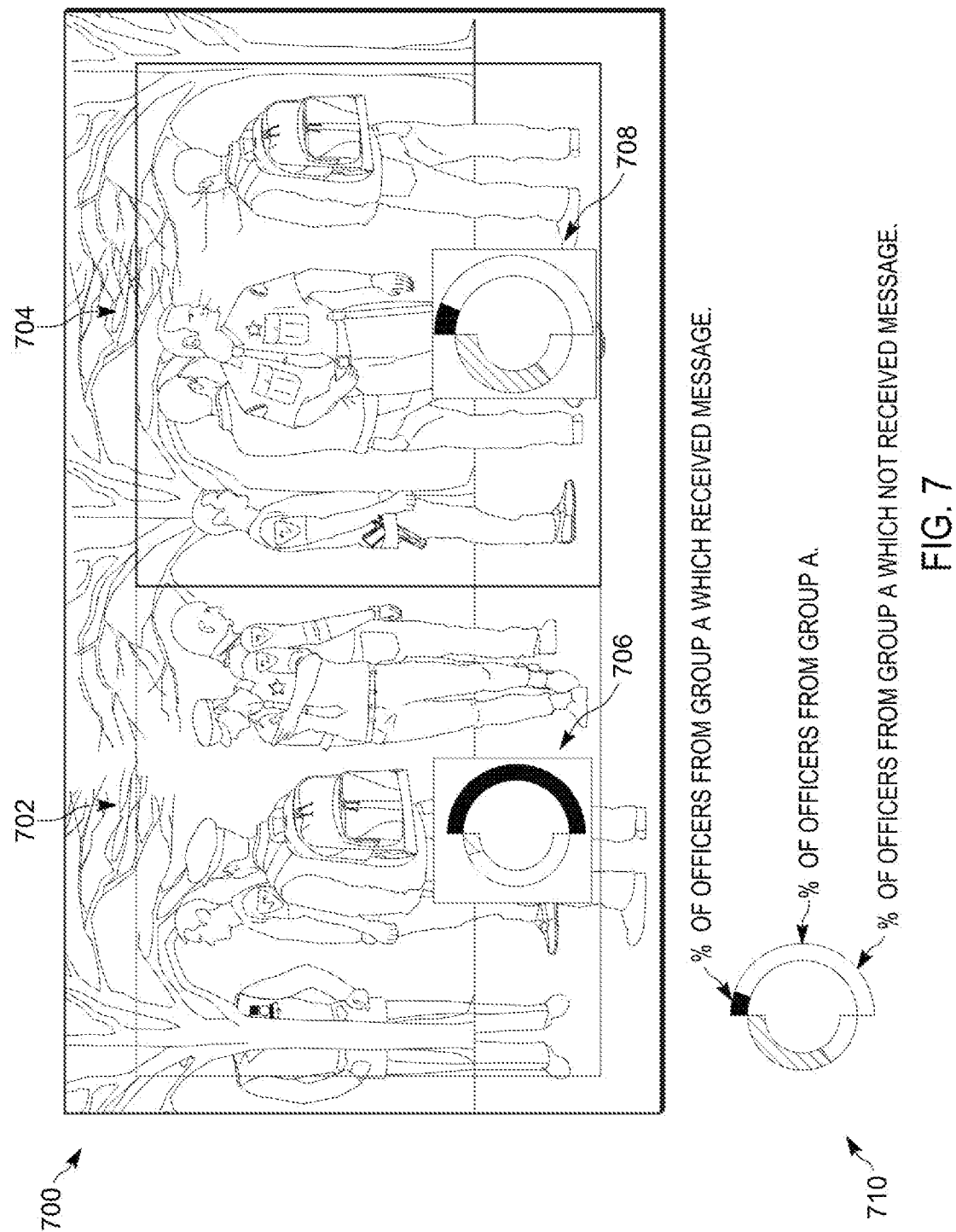

CONTEXT BASED CALL STATUS TRACKING FOR RELEVANT DISPATCH CALL PARTICIPANTS

BACKGROUND OF THE INVENTION

Public safety agencies use portable communications devices (for example, land mobile radios) to facilitate communication between their personnel while responding to incidents. To streamline communication, personnel may be assigned to different communication groups (sometimes referred to as "talkgroups"). Dispatchers coordinating an incident response utilize multiple software applications and communicate with personnel participating in multiple talkgroups, which may span multiple agencies. Ensuring the delivery of pertinent information from the dispatcher to responding personnel over the land-mobile radio network improves the effectiveness of the incident response.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a diagram illustrating aspects of the operation of the method of FIG. 4 in accordance with some embodiments.

Figure 1:
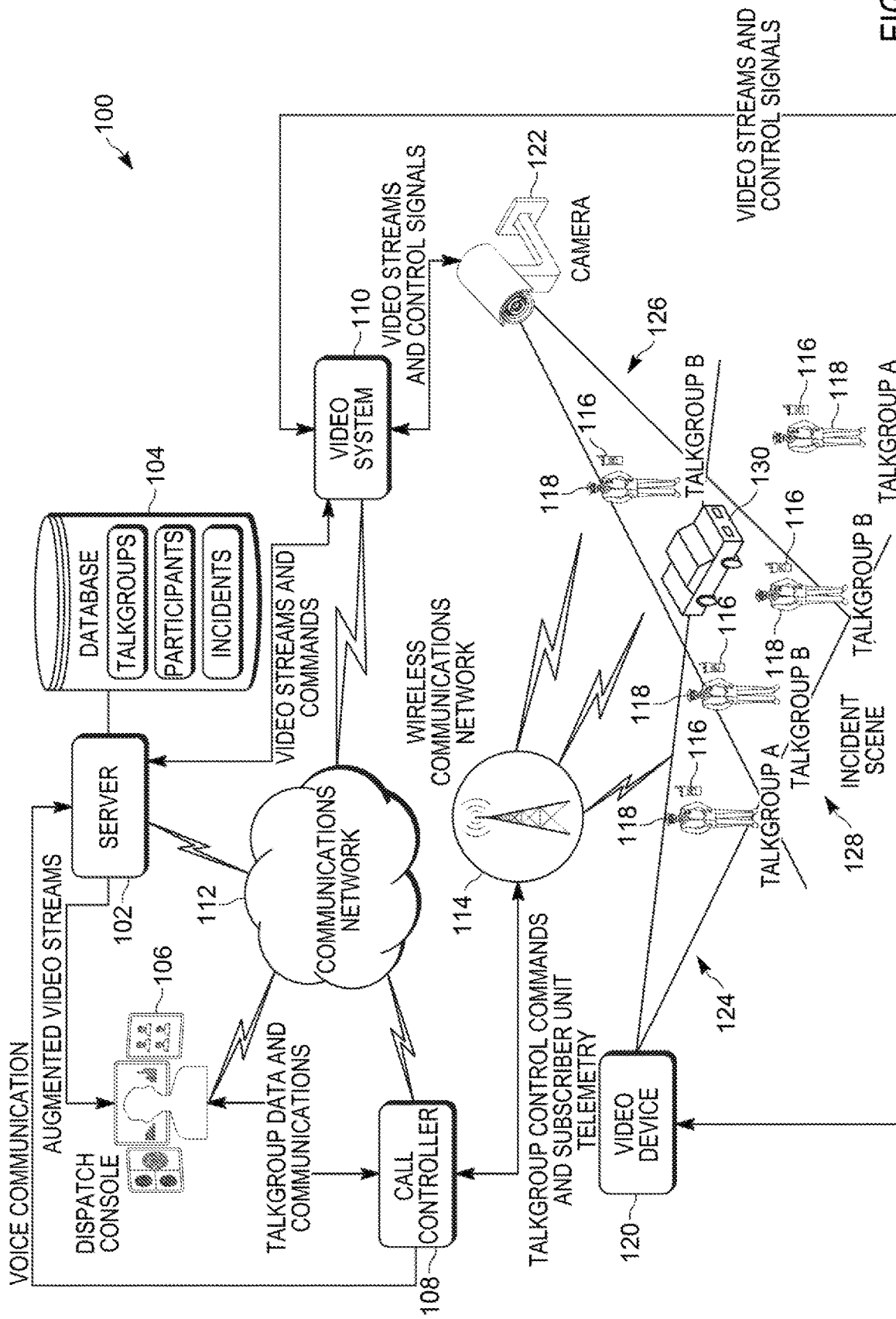
FIG. 1 is a diagram of a system for indicating call status for relevant dispatch call participants in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Computer-aided dispatch systems are used for, among other things, coordinating incident response. Dispatchers (for example, public safety dispatchers) receive calls, evaluate an incident that is being described by a caller, and formulate a proper response to attempt to help a caller with the incident. When attempting to help the caller, dispatchers communicate with one or more public safety agencies to coordinate a response to the incident. For example, the dispatcher may communicate with a law enforcement agency to inform public safety officers that a crime has been or is being committed. In another example, the dispatcher communicates with an emergency medical services agency to inform paramedics that an ambulance is needed at a location where a person is in medical distress. To receive calls and coordinate responses, dispatchers use dispatch consoles that may include interactive displays for executing and monitoring wireless communication (for example, using a land mobile radio network), interacting with incident databases, and observing the incident response (for example, via a video analytics system).

Within land mobile radio and other wireless networks, talkgroups are used to organize and streamline communications. Talkgroups provide virtual radio channels in digital radio systems for use by subsets of users of a communications network. Dispatchers and talkgroup participants are able to communicate with one another using push-to-talk (PTT) communications. Talkgroup communications are kept within the talkgroup and are not transmitted to others using the same communications network who are not participants in the talkgroup. Coordinating an incident response often requires that a dispatcher communicate with more than one talkgroup. For example, a traffic accident response may involve responders from police, fire, and emergency medical agencies, each operating at least one talkgroup. Dispatchers receive and disseminate information necessary for responding to the incident. For example, dispatchers inform responding personnel regarding the nature and location of the incident, the number of parties involved, and the identities of the parties and other responding agencies, units, or personnel. Talkgroup participants must also communicate information relevant to the response to the dispatcher and amongst themselves. For example, a first responder may locate a citizen in need of medical attention and request help.

Public safety incident response is most effective when communications relating to the response are received by the relevant recipients and when dispatchers are able to adequately monitor the response to an incident. However, many things can interfere with this. For example, a first responder may be in a different talk group than the talkgroup being addressed, the responder may be out of radio range, the responder's radio may have too low of a received signal strength indicator (RSSI) value, the responder's radio volume may be too low, and the like. Dispatchers are tasked with monitoring voice communications and video feeds from multiple sources, and may not be able to quickly identify which first responders are most relevant to a particular communication or whether such responders received the messages transmitted to them from the dispatcher. To determine whether messages are received, a dispatcher may use software for real time call monitoring (for example, ZoneWatch™ by Motorola Solutions), observe Air Traffic Information Access (ATIA) reporting, or engage in follow up communications to ask recipients for confirmation. Dispatchers may also use dispatch console software to check if a responder's radio unit is functioning when the dispatcher has some reason to doubt the availability of the radio unit or that the radio unit is functionally properly. Another dispatch console feature allows the console operator to remotely interrogate a radio unit and obtain its current status. However, these current solutions require manual action and may distract the dispatcher from incident call workflow. In situations where multiple responders organized into multiple talkgroups are responding to an incident, it may not be readily apparent which first responders are particularly relevant to given communication, or which first responders may require the dispatcher's attention. During incident response, situations may change quickly and often. In such cases, follow up communications may be used to verify which responders are in most need of the dispatcher's attention.

Engaging in manual status checks, radio interrogations, and follow-up communication too often may cause a technical problem by increasing communication and data traffic and slowing down the network that supports the communication. Alternatively, engaging in such checks and follow-up communications too sparingly may prevent the dispatcher from timely recognizing that a first responder is not receiving relevant communications or otherwise needs assistance.

In addition to engaging in and monitoring voice communications, dispatchers often receive and monitor closed circuit television (CCTV) video streams (for example, from a video analytics system) of an incident response. Such video streams, while generally related to the incident, may or may not include images of some or all of the personnel responding to an incident. The video sources capturing the video streams have different fields of view, some of which may change as the video source moves during the incident response. In order to identify which video streams contain relevant responders, the dispatcher may have to manually scan the different video streams or engage in further follow up communications to determine where various responders are located at the incident scene. This results in wasted time, and follow-up communication may cause a technical problem by increasing communication and data traffic and slowing down the network that supports the communication.

To address, among other things, these problems, systems and methods are provided herein for indicating call status for relevant dispatch call participants. Among other things, embodiments provided herein automatically extract context information from talkgroup voice communications. The context information is used to select relevant participants (first responders) from the talkgroup. Video streams containing images of the relevant participants are augmented to highlight the relevant participant, and context information, such as talkgroup membership and radio status may be presented in the augmented video streams. The video streams are prioritized and displayed (for example, on a dispatch console). Using such embodiments, dispatchers are able to quickly identify relevant responders and whether or not transmissions are being received by the relevant responders. This reduces the need for manual checks and follow up communications, leading to more efficient use of the communications network and its associated computing resources. Embodiments presented herein also allow dispatchers to quickly identify and locate newly-relevant responders, thereby improving the public safety response to the incident. For example, a responder requesting medical assistance or backup may be highlighted in a video stream that is automatically displayed for the dispatcher, allowing the dispatcher to quickly identify the need and direct further resources to the responder. Such embodiments also provide more efficient use of communications infrastructure by reducing the time and tasks necessary to identify and locate relevant responders.

One example embodiment provides system for indicating call status for relevant dispatch call participants. The system includes a display, a transceiver, and an electronic processor. The electronic processor is communicatively coupled to the display and the transceiver. The electronic processor is configured to receive, via the transceiver, a voice communication associated with a talkgroup, the talkgroup having a plurality of participants. The electronic processor is configured to determine, from the voice communication, context information for the plurality of participants. The electronic processor is configured to select, based on the context information, a relevant participant for the talkgroup from the plurality of participants. The electronic processor is configured to receive, via the transceiver, a plurality of video streams. At least one of the plurality of video streams includes an image of one or more of the plurality of participants. The electronic processor is configured to, for each of the plurality of video streams, responsive to determining that the video stream includes an image of the relevant participant, augment the video stream to include a highlighted image of the relevant participant. The electronic processor is configured to, for each of the plurality of video streams, assign a priority based on the highlighted image of the relevant participant and the context information. The electronic processor is configured to select, based on the priorities assigned to each of the plurality of video streams, a video stream including the highlighted image of the relevant participant. The electronic processor is configured to present the video stream on the display.

Another example embodiment provides a method for indicating call status for relevant dispatch call participants. The method includes receiving, via a transceiver, a voice communication associated with a talkgroup, the talkgroup having a plurality of participants. The method includes determining, with an electronic processor, context information for the plurality of participants from the voice communication. The method includes selecting a relevant participant for the talkgroup from the plurality of participants based on the context information. The method includes receiving, via the transceiver, a plurality of video streams. At least one of the plurality of video streams includes an image of one or more of the plurality of participants. The method includes, for each of the plurality of video streams, responsive to determining that the video stream includes an image of the relevant participant, augmenting the video stream to include a highlighted image of the relevant participant. The method includes, for each of the plurality of video streams, assigning, with the electronic processor, a priority based on the highlighted image of the relevant participant and the context information. The method includes selecting, a video stream including the highlighted image of the relevant participant based on the priorities assigned to each of the plurality of video streams. The method includes presenting the video stream on a display.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a diagram of one embodiment of a communications system 100, which is configured to, among other things, indicate call status for relevant dispatch call participants. FIG. 1 shows one example of a networked configuration, in which embodiments may be implemented; other configurations are possible. In the example illustrated, the system 100 includes a server 102, a database 104, a dispatch console 106, a call controller 108, and a video system 110. It should be understood that the system 100 is provided as one example and, in some embodiments, the system 100 may include fewer or additional components. For example, the system 100 may include multiple servers 102, multiple databases 104, multiple dispatch consoles 106, multiple call controllers 108, or multiple video systems 110, or combinations thereof. As would be understood by one skilled in the art, FIG. 1 is a simplified diagram and networks are more complex than the schematic elements depicted in FIG. 1.

The server 102, database 104, dispatch console 106, call controller 108, and video system 110 are communicatively coupled to one another via a communications network 112. The communications network 112 is a communications network including wireless connections, wired connections, or combinations of both. The communications network 112 may be implemented using a local area network, for example, a Bluetooth™ network or a Wi-Fi network, a wide area network, for example, the Internet, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof.

Figure 2:
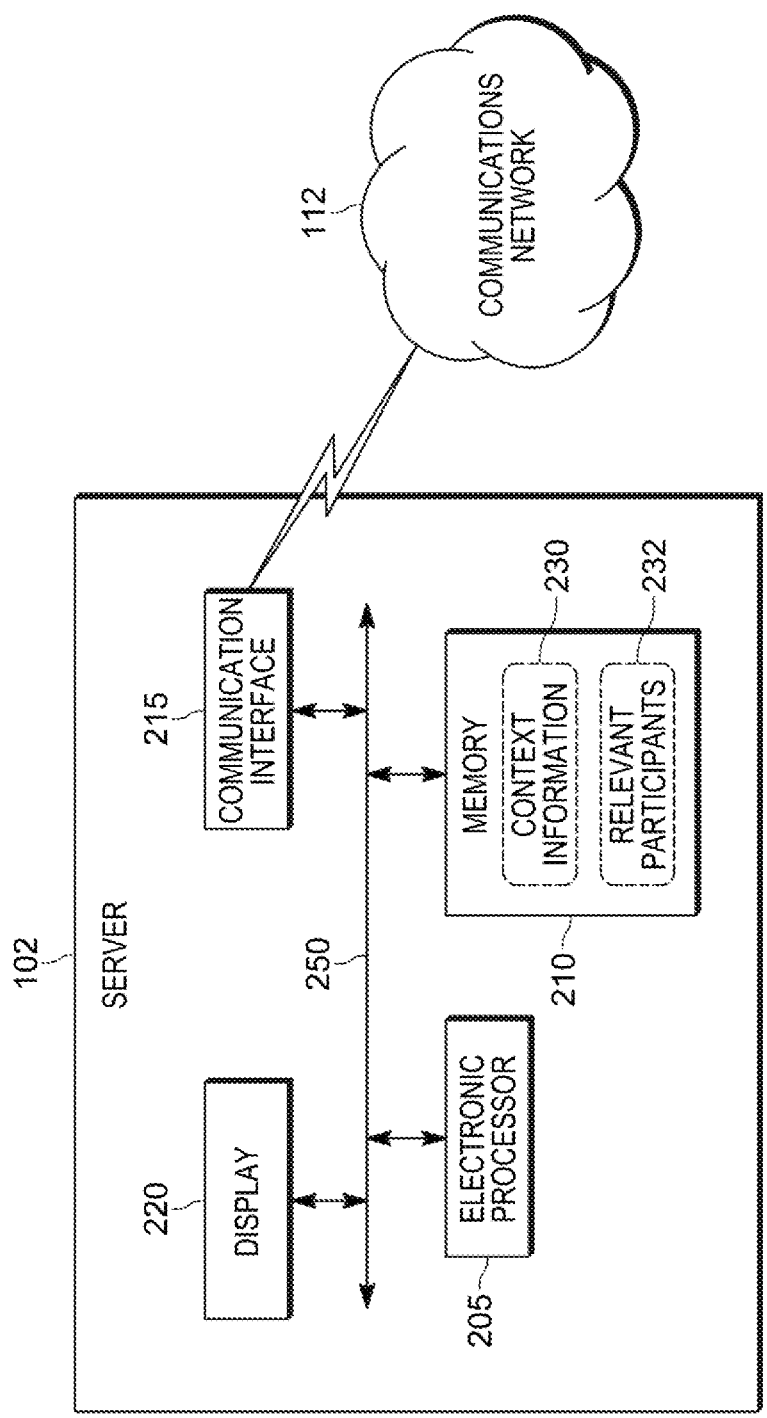
FIG. 2 is a block diagram of a server of the system of FIG. 1 in accordance with some embodiments.

The server 102, described more particularly below with respect to FIG. 2, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system (for example, a data warehouse) external to the system 100 and accessible by the server 102 over one or more wired or wireless networks. In some embodiments, all or part of the database 104 may be locally stored on the server 102.

In some embodiments, the server 102 and the database 104 are part of a computer-aided dispatch system. For example, the server 102 may use data stored in the database 104 and received from public safety personnel (for example, the talkgroup participants 118), E911 callers, and other sources to dispatch personnel to respond to incidents. In some embodiments the database 104 electronically stores talkgroup data, participant data, and incident data.

Examples of talkgroup data include data designating talkgroup identifiers, talkgroup assignments designating which of the subscriber units 116 are assigned to which talkgroups, context data for talkgroups (including, for example, rules for talkgroup membership and operation), and over-the-air data (for example, telemetry data for the subscriber units 116).

Examples participant data include participant identifiers (for example, name, rank, agency, assignment, and the like), a participant role (for example, identifying a supervisory role or an area of operation overall or within the incident), and participant subscriber unit data (for example, model, configuration, and participant assignment information for the subscriber units 116).

In some embodiments, the database 104 stores the incident data in a computer aided dispatch (CAD) incident database. As used herein, the term "incident" may refer to a situation requiring the attention of one or more public safety agencies. In one example, an incident is a crime in progress, such as a bank robbery. In other examples, an incident is the response to a call for service, for example, responding to a traffic accident, searching for a suspect, locating a missing person, responding to a fire, responding to a medical emergency, investigating a past incident, and the like. The incident data for a given incident includes an incident type (for example, a crime, a fire, a medical emergency, a natural disaster, a traffic stop, and the like), an incident identifier (for example, a unique alphanumeric code that identifies the incident record within a computer-aided dispatch system), and the like.

As described herein, the server 102 and the database 104 operate to receive talkgroup voice communications from the call controller 108 and video streams from the video system 110 and transmit augmented video streams to the dispatch console 106.

The dispatch console 106 is a computer-aided dispatch terminal for a public safety organization operated by a dispatcher. In some embodiments, the dispatch console 106 is a computer server that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, computer-aided dispatch functions as described herein. The dispatch console 106 sends and receives data over the communications network 112 using the network interface. In some embodiments, the dispatch console 106 includes a portable radio or a stationary radio that functions similarly to the subscriber units 116, as described herein. In some embodiments, the dispatch console 106 is coupled to a telephone line to allow the dispatcher to receive calls from public citizens. In some embodiments, the dispatch console 106 includes a headset coupled to the portable radio or stationary radio. The headset may be worn by the dispatcher to allow the dispatcher to communicate with callers and public safety officers in a hands-free manner that allows the dispatcher to simultaneously operate the console or another computer during a call. While the dispatch console 106 is described herein with reference to a single dispatcher, in some embodiments, the dispatch console 106 is located at a dispatch center that includes a plurality of dispatch consoles 106 that are each operated by one or more dispatchers.

The call controller 108 is an electronic device that controls some or all of the aspects of the wireless communications network 114. In the illustrated embodiment, the wireless communications network 114 is a land mobile radio (LMR) network. LMR systems are terrestrially-based, wireless communications systems commonly used by federal, state, local, tribal, and territorial emergency responders, public works companies, and even the military to support voice and low-speed data communications. Such systems typically consist of handheld portable two-way radios, mobile two-way radios, base stations, a network, and repeaters. LMR systems provide two-way radio communications, typically in the VHF, UHF, 700 MHz, and 800 MHz frequency bands, for example, implemented in accordance with the Association of Public Safety Communications Officials (APCO) "Project 25" (P25) two-way radio communications protocol. In some embodiments, the wireless communications network 114 may operate according to the TETRA standard defined by the European Telecommunications Standards Institute (ETSI), the Digital Private Mobile Radio (dPMR) standard also defined by the ETSI, the Digital Mobile Radio (DMR) standard also defined by the ETSI, among other possibilities, and over which multimedia broadcast multicast services (MBMS), single site point-tomultipoint (SC-PTM) services, or Mission Critical Push-to-talk (MCPTT) services may be provided.

The call controller 108 may be, for example, a dispatch controller for a public safety organization. The call controller 108 communicates with the subscriber units 116 via the wireless communications network 114. On a singular basis, one of the subscriber units 116 may be referred to herein as a subscriber unit 116. Each of the subscriber units 116 is a portable communications device, and may be, for example, a mobile two-way radio, a smart telephone, a smart watch, a laptop computer, a tablet computer, or other similar device capable of operating as described herein. As described in detail herein, the call controller 108 sends talkgroup commands (for example, adding or removing subscriber units from one or more talkgroups) to the subscriber units 116. As illustrated in FIG. 1, the subscriber units 116 transmit and receive data and voice communications among themselves and with the dispatch console 106, which operates to transmit and receive communications with the subscriber units 116 via the call controller 108. In some embodiments, the call controller 108 provides model, configuration, and user characteristic information for the subscriber units 116, and contextual condition data (for example, telemetry and other data relating to the subscriber units and first responder users of the subscriber units) to the server 102.

In the embodiment illustrated, the wireless communications network 114 operates in a trunked configuration. The wireless communications network 114 and its subscriber units use a pool of traffic channels for a virtually unlimited number of talkgroups of subscriber units. Thus, all groups are served by all channels. A trunked radio system operates to take advantage of the probability that not all groups need a traffic channel for communication at the same time. With a given number of channels, a much greater number of groups may be accommodated in a trunked radio system as compared with a conventional radio system. As used in the present application, the term "talkgroup" refers to a virtual radio channel that is used for communication among a group of subscriber units. As noted, an organization may have several talkgroups and each talkgroup may be associated with a particular mission of the organization. A mission refers to a task or activity assigned to one or more members of an organization or a sub-division thereof. For example, a talkgroup may include a group of police officers patrolling a predefined neighborhood. Similarly, a talkgroup may include members who have the same role or designation (for example, police office, detective, paramedic, and the like) within a mission. For example, paramedics and firefighters responding to a distress call may be grouped into two different talkgroups part of the same mission. Each subscriber unit in a particular talkgroup is assigned a talkgroup identifier, which allows the subscriber unit to communicate with other subscriber units assigned the same talkgroup identifier. Subscriber units (and thus the users of the subscriber units) can be assigned to multiple talkgroups.

As shown, each of the subscriber units 116 is operated by one of the first responders 118. Each of the first responders 118 may be a public safety officer, a firefighter, an emergency medical technician, or the like. In the example illustrated in FIG. 1, the subscriber units 116 (and thus the first responders 118) are divided into two talkgroups: Talkgroup A and Talkgroup B. In some embodiments, talkgroups are created and administrated by the call controller 108.

In some embodiments, the video system 110 is or includes a computer server that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, video analytics functions as described herein. The video system 110 sends and receives data over the communications network 112 using the network interface. The video system 110 includes software and hardware (for example, video processors and object classifier algorithms) to electronically detect and classify objects within images and video streams captured by video sources (for example, the video device 120 and the camera 122).

The video device 120 (described more particularly herein with respect to FIG. 3) and the camera 122 include image capture devices for capturing images and video streams, including a portion of or the entire incident scene 128. In some embodiments, the video device 120 is worn and operated by one of the first responders 118, who are responding to an incident at the incident scene 128.

The camera 122 may be a vehicle dash camera, a surveillance camera, a traffic camera, or another suitable image capture device that records video of the incident scene 128 from a fixed or movable position. As shown in FIG. 1, the video sources need not be located within the incident scene 128 in order to capture video images of the incident scene 128. The video device 120 and the camera 122 transmit their respective captured images and video streams to the video system 110, via the communications network 112.

As noted, video streams are captured by video sources. Video sources are characterized (for example, in the database 104) by, among other things, their image capture capabilities (for example, resolution, frame rate, night vision capability, and the like), their locations, and their fields of view. For example, as shown in FIG. 1, the video system 110 includes at least two video sources (the video device 120 and the camera 122). The video device 120 has a field of view 124, in which can be seen a portion of the incident scene 128. The camera 122 has a field of view 126, in which can be seen a portion of the incident scene 128. However, neither field of view permits their respective video sources to capture images of the entire incident scene 128. For example, the video device 120 is able to capture images of all of the participants in Talkgroup A, but is only able to capture images of two of the three participants of Talkgroup B. Similarly, the camera 122 is not able to capture images of all of the participants of Talkgroup B because an object, the vehicle 130, obstructs the field of view.

FIG. 1 illustrates only one example embodiment of the system 100. In other embodiments, the system 100 may include more or fewer components and may perform functions that are not explicitly described herein. In addition, although the call controller 108 is illustrated as communicating with the subscriber units 116 via a single wireless communications network 114, the call controller 108 may communicate with the subscriber units 116 via multiple communication networks (constructed in accordance with various network protocols) and connections (for example, wired or wireless connections). Further, although the system 100 is shown as a centralized system, the system 100 may also be implemented as a decentralized system in which the functionality of the call controller 108 is accomplished within one or more of the subscriber units 116, or in other network infrastructure (not shown).

FIG. 2 illustrates the server 102 in more detail. In the example provided, the server 102 includes an electronic processor 205, a memory 210, a communication interface 215, and a display 220. The illustrated components, along with other various modules and components (not shown) are coupled to each other by or through one or more control or data buses (for example, a communication bus 250) that enable communication therebetween. The use of control and data buses for the interconnection between and exchange of information among the various modules and components would be apparent to a person skilled in the art in view of the description provided herein. FIG. 2 illustrates only one example embodiment of the server 102. The server 102 may include fewer or additional components and may perform functions other than those explicitly described herein.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, context information 230 and relevant participant data 232 (both described in detail herein).

The communication interface 215 is configured to receive input and to provide system output. The communication interface 215 obtains information and signals from, and provides information and signals to, (for example, over one or more wired and/or wireless connections) devices both internal and external to the server 102. The communication interface 215 may include a wireless transmitter or transceiver for wirelessly communicating over the communications network 112. Alternatively or in addition to a wireless transmitter or transceiver, the communication interface 215 may include a port for receiving a cable, such as an Ethernet cable, for communicating over the communications network 112 or a dedicated wired connection. It should be understood that, in some embodiments, the server 102 communicates with other devices through one or more intermediary devices, such as routers, gateways, relays, and the like.

The display 220 is a suitable display such as, for example, a liquid crystal display (LCD) touch screen, or an organic light-emitting diode (OLED) touch screen. In some embodiments, the server 102 implements a graphical user interface (GUI) (for example, generated by the electronic processor 205, from instructions and data stored in the memory 210, and presented on the display 220), that enables a user to interact with the server 102. In some embodiments, the server 102 enables display remotely, for example, using a display of the dispatch console 106. In some embodiments, the server 102 operates using, among other things, augmented reality technology, where video streams are displayed (for example, on the display 220 or the dispatch console 106) with text, graphics, or graphical user interface elements superimposed on or otherwise combined with the video stream's images.

In some embodiments, the server 102 uses various machine learning methods to analyze the data stored in the database 104 and make determinations regarding the video analytics systems and policies. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as, among other things, an intelligent system, an artificial intelligence (AI) system, or a cognitive system.

In some embodiments, the dispatch console 106, call controller 108, and video system 110 are or include computer servers, which include similar components and overall are configured similarly to the server 102.

Figure 3:
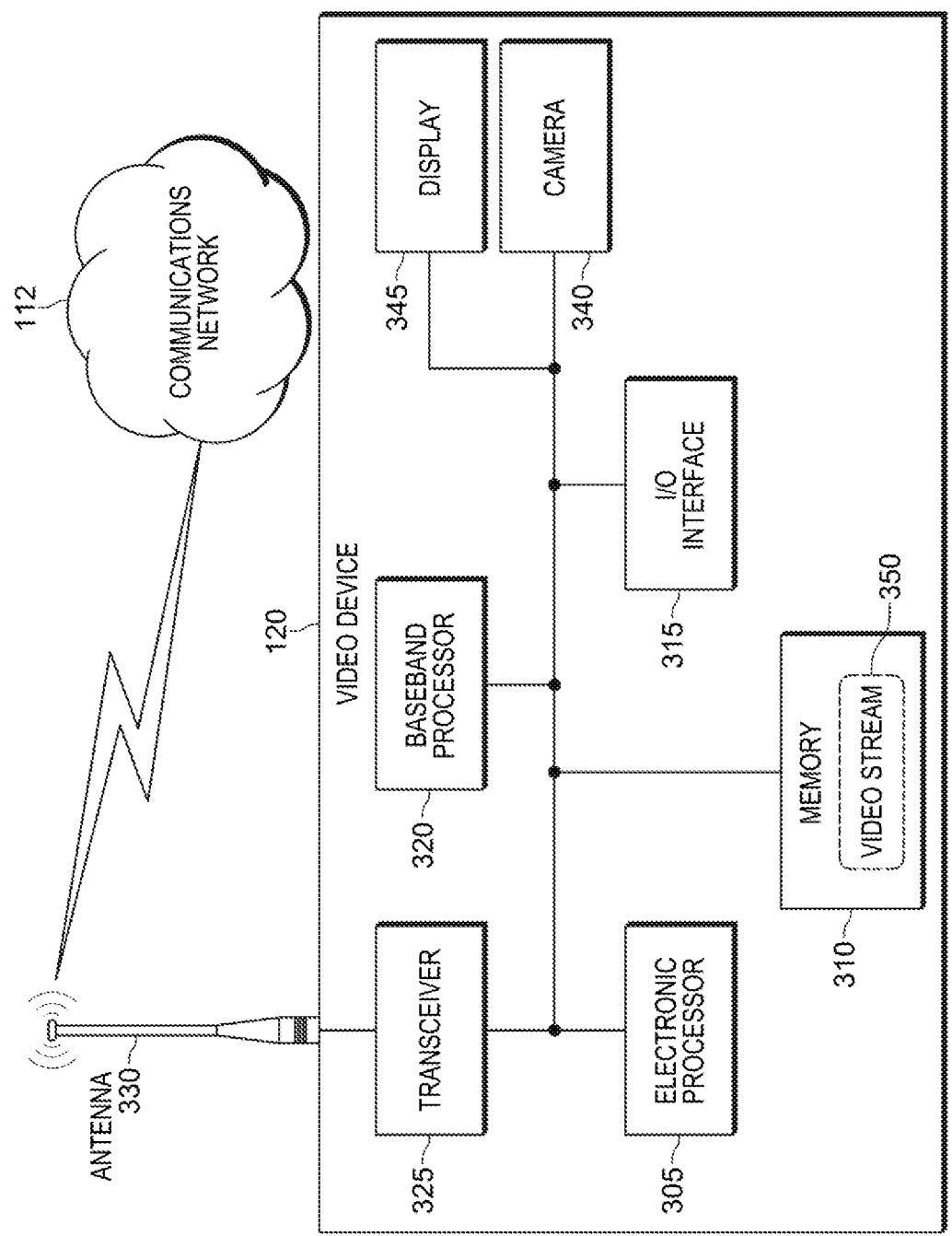
FIG. 3 is a block diagram of a video device of the system of FIG. 1 in accordance with some embodiments.

FIG. 3 illustrates an example of the video device 120. In the embodiment illustrated, the video device 120 includes an electronic processor 305, a memory 310, an input/output interface 315, a baseband processor 320, a transceiver 325, an antenna 330, a camera 340, and a display 345. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 305 obtains and provides information (for example, from the memory 310 and/or the input/output interface 315), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the capture and transmission of video streams.

The memory 310 can include one or more non-transitory computer-readable media, and includes a program storage area and a data storage area. The program storage area and the data storage area can include combinations of different types of memory, as described herein. In the embodiment illustrated, the memory 310 stores, among other things, a video stream 350.

The input/output interface 315 is configured to receive input and to provide system output. The input/output interface 315 obtains information and signals from, and provides information and signals to, (for example, over one or more wired and/or wireless connections) devices both internal and external to the video device 120.

The electronic processor 305 is configured to control the baseband processor 320 and the transceiver 325 to transmit and receive video and other data to and from the video device 120. The baseband processor 320 encodes and decodes digital data sent and received by the transceiver 325. The transceiver 325 transmits and receives radio signals to and from, for example, the communications network 112 using the antenna 330. The electronic processor 305, the baseband processor 320, and the transceiver 325 may include various digital and analog components, which for brevity are not described herein and which may be implemented in hardware, software, or a combination of both. Some embodiments include separate transmitting and receiving components, for example, a transmitter and a receiver, instead of a combined transceiver 325.

The camera 340 is an image capture device for capturing images and video streams, including a portion or the entire incident scene 126, by, for example, sensing light in at least the visible spectrum. The camera 340 communicates the captured images and video streams to the electronic processor 305 via the input/output interface 315. It should be noted that the terms "image" and "images," as used herein, may refer to one or more digital images captured by the camera 340, or processed by the electronic processor 305, or displayed on the display 345. Further, the terms "image" and "images," as used herein, may refer to still images or sequences of images (that is, a video stream). As illustrated, the camera 340 is integrated into the video device 120. In alternative embodiments, the camera 340 is separate from the video device 120, and communicates captured images to the video device 120 via a wired or wireless connection. For example, the camera 340 may be integrated into a body-worn camera or smart glasses, which communicate with the video device 120.

In some embodiments, the camera 340 may be a stereoscopic camera, or the video device 120 may include a stereoscopic camera. In such embodiments, the video device 120 can capture three-dimensional information about the incident scene 128 and the first responders. In some embodiments, three-dimensional information may be captured using radar sensors or infrared ranging sensors (not shown).

The display 345 is a suitable display such as, for example, a liquid crystal display (LCD) touch screen, or an organic light-emitting diode (OLED) touch screen. The video device 120 implements a graphical user interface (GUI) (for example, generated by the electronic processor 305, from instructions and data stored in the memory 310, and presented on the display 345), that enables a user to interact with the video device 120. In some embodiments, the video device 120 operates or is integrated with a head-mounted display (HMD), an optical head-mounted display (OHMD), or the display of a pair of smart glasses.

In some embodiments, the video device 120 operates using, among other things, augmented reality technology, where live images are captured by the camera 340 and displayed (for example, on the display 345) with text, graphics, or graphical user interface elements superimposed on or otherwise combined with the live images.

In some embodiments, the video device 120 is a body worn camera. In other embodiments, the video device 120 may be smart glasses, integrated into a helmet or other headgear, or may be another portable or mobile electronic device containing software and hardware enabling it to operate as described herein.

Figure 4:
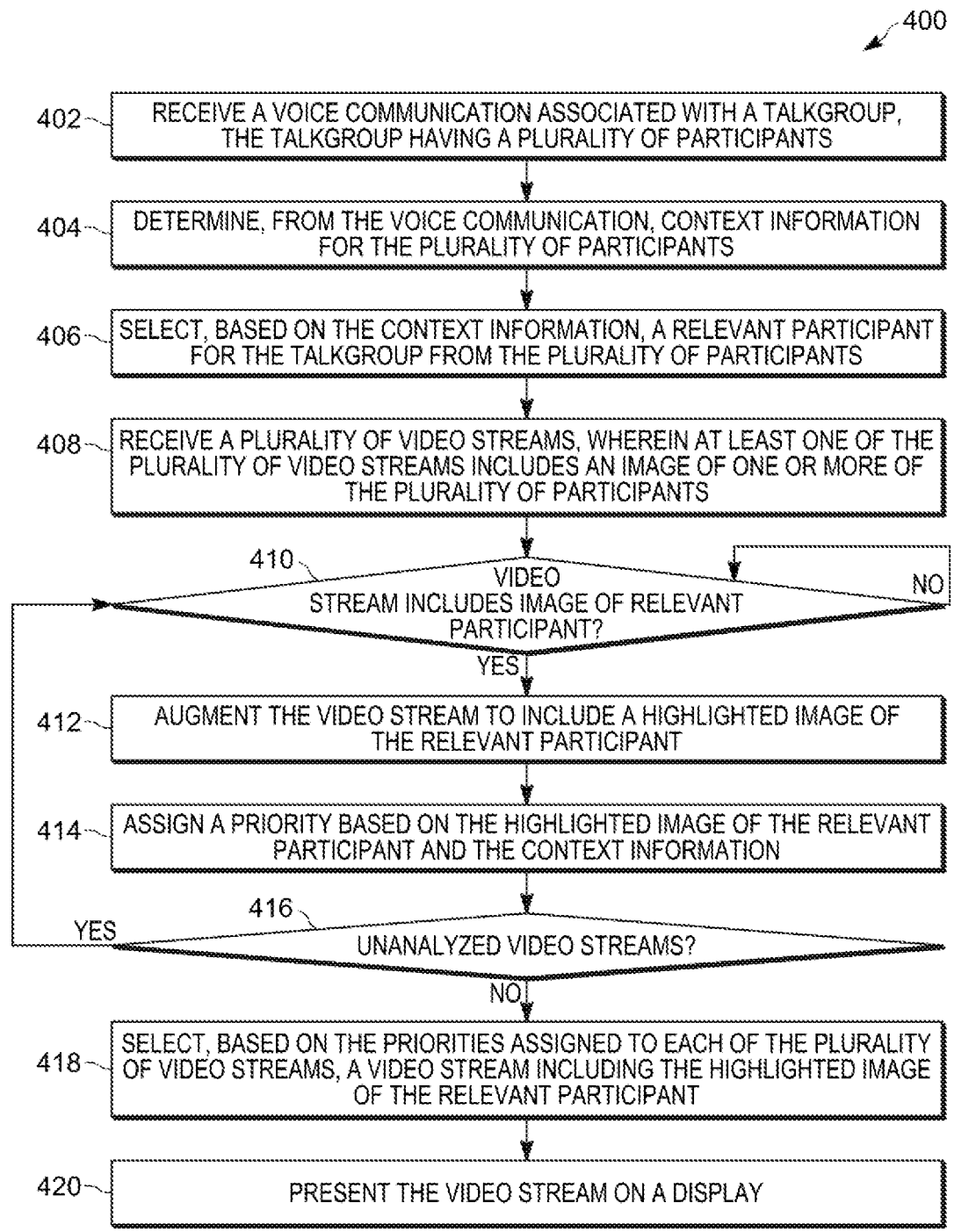
FIG. 4 is a flowchart illustrating a method for operating the system of FIG. 1 in accordance with some embodiments.

FIG. 4 illustrates an example method 400 for indicating call status for relevant dispatch call participants. Although the method 400 is described in conjunction with the system 100 as described herein, the method 400 could be used with other systems and devices. In addition, the method 400 may be modified or performed differently than the specific example provided.

As an example, the method 400 is described as being performed by the server 102 and, in particular, the electronic processor 205. However, it should be understood that in some embodiments, portions of the method 400 may be performed by other devices, including for example, the dispatch console 106. Additional electronic processors may also be included in the dispatch console 106 and/or server 102 that perform all or a portion of the method 400. For ease of description, the method 400 is described in terms of a single talkgroup and a single relevant participant. However, the method 400 may be applied to multiple talkgroups and relevant participants.

At block 402, the electronic processor 205 receives (for example, via a transceiver of the communication interface 215), a voice communication associated with a talkgroup (for example, Talkgroup A or Talkgroup B, as illustrated in FIG. 1). The talkgroup has a plurality of participants (for example, two or more first responders) assigned to it. The voice communication is an audio stream including spoken words transmitted by the dispatcher or one of the talkgroup participants. In some embodiments, the voice communication is a sequence of audio streams (for example, a conversation between the dispatcher, one or more talkgroup participants, or combinations thereof).

At block 404, the electronic processor 205 determines, from the voice communication, context information for the plurality of talkgroup participants. For example, the server 102, call controller 108, or another electronic device may include an automatic speech recognition (ASR) engine, which receives the audio signals and performs text transcription of the voice communication to generate text corresponding to the voice communication and store the text in an electronic memory. The server 102, call controller 108, or another electronic device may also include a natural language processing (NLP) engine, which determines the context information for the plurality of participants from the voice communication by analyzing the text. Context information includes one or more of a current dispatch console context, a status for at least one of the plurality of participants, an incident identifier, an incident type, and a current talkburst level. A current dispatch console context may be one or more contexts displayed on the dispatch console (for example, there may be a context for each talk group, each incident, etc.). For example, it can be determined, using the NLP engine, that Unit 4 belongs to an incident context with fire in a small house, and the responders for that incident are assigned into talk group 7. In some embodiments, this context information can be used to assign incoming voice messages into the correct dispatch console context and to display or highlight the relevant contexts on the console for the dispatcher. A participant's status may be an indication of whether they are engaged or disengaged in the incident response, and in what capacity (for example, "Unit 4 is on scene" or "Officer Jones will enter the building"). A participant's status may also indicate whether they are safe or potentially in danger (for example, "Officer Smith is injured."). Context data may also include an identifier for a first responder (for example, one first responder mentioning or addressing another first responder by name (for example, "Smith" or other identifying words (for example, "the lieutenant")). A current talkburst level may indicate the load of the dispatch console or the dispatch operating manning the console. For example, the current talkburst level may be determined based on how many calls are in queue or in progress. The current talkburst level may also apply to a talkgroup participant, indicating, for example, how often the participant's subscriber unit is in use (for example, how many calls are received or generated by the device).

At block 406, the electronic processor 205 selects, based on the context information, a relevant participant for the talkgroup from the plurality of participants. A relevant participant is a first responder that should be brought to the attention of the dispatcher because circumstances indicate that it will be important for the dispatcher to make sure dispatch calls to this participant are received or because the dispatcher may need to be aware of this participant. For example, if the context information indicates that a first participant is repeatedly addressing a second participant with the same words, the second participant may be selected as relevant because it is possible that they are not reliably receiving radio transmissions. In another example, if the context information indicates that "Sgt. Smith" is giving direction to several other talkgroup participants, then "Sgt. Smith" would be identified as relevant because she is leading a portion of the incident response. In another example, if one participant was reporting that an officer was in danger, that participant would be identified as relevant because it would be important that the dispatcher be aware of the situation and that the participant reporting the danger receive all dispatch calls as help is summoned for the officer in danger.

In some embodiments, the electronic processor 205 determines a cognitive load for at least one of the plurality of participants, and this cognitive load is used in addition to context data to select relevant participants. Cognitive load provides an indication of a user's ability to receive and respond to a communication or stimulus based on the activities in which the user is currently engaged. For example, a user who is driving a vehicle may be less able to respond to communications than a user who is stationary. In another example, a user who is on foot and moving quickly (for example, during a police foot pursuit of a suspect) may be less able to respond to a communication than a user who is driving a squad car or sitting in a squad car. In another example, a user who is very frequently communicating may be less able to respond to a new communication than a user who is not so engaged. In some embodiments, the cognitive load is expressed as a numerical value (for example, a decimal number, an integer, or a percentile) that indicates the user's current cognitive load. For example, the higher the value, the higher the user's cognitive load.

The electronic processor 205 selects the relevant participant for the talkgroup from the plurality of participants based further on the cognitive load for the at least one of the plurality of participants. For example, the context information extracted from the voice communication may indicate that one of the participants is frequently receiving and transmitting communications related to different aspects of the response, and therefore has a higher cognitive load than other participants. In this example, this participant may be selected as relevant because their cognitive load increases the likelihood that they will miss a communication from the dispatcher or because it may be advisable for the dispatcher to view video of this participant.

In some embodiments, the electronic processor 205 identifies more than one relevant participant from the plurality of participants. In some embodiments, the electronic processor 205 assigns a relevancy score to each of the plurality of participants, and selects one of or more relevant participants by comparing the relevancy scores (for example, by selecting the three highest scores).

At block 408, the electronic processor 205 receives (for example, via a transceiver of the communication interface 215) a plurality of video streams (for example, from the video system 110). In some embodiments, video streams associated with the location of the incident are automatically requested by the electronic processor 205. In some embodiments, video streams are produced by video devices (for example, the video device 120) carried or operated by first responders at the incident scene. At least one of the plurality of video streams includes an image of one or more of the plurality of participants.

At block 410, the electronic processor 205, for each of the plurality of video streams, determines whether an image of the relevant participant is in the video stream. In some embodiments, the electronic processor 205 determines whether the video stream includes an image of the relevant participant using an object classifier. In some embodiments, the video system 110 analyzes its video sources and provides annotated video streams to the server 102. The annotations indicate which talkgroup participants are present in the video streams. In some embodiments, the video system 110 receives a request from the server 102 for video streams including the talkgroup participants associated with a current incident, and sends only those video streams to the server 102.

Figure 5:
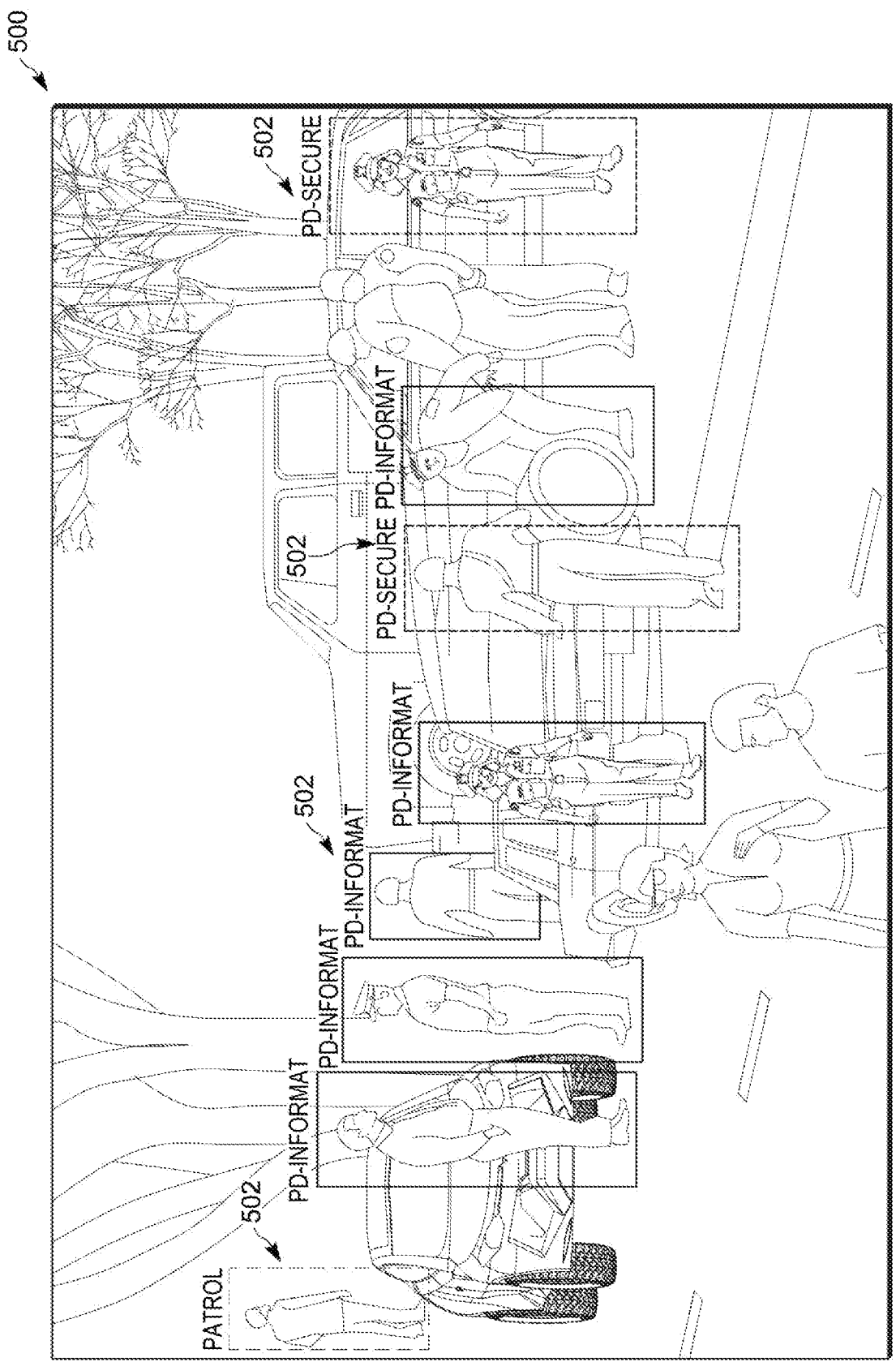
FIG. 5 is a diagram illustrating aspects of the operation of the method of FIG. 4 in accordance with some embodiments.

Regardless of how it is determined that the relevant participant is present in a video stream, at block 412, the electronic processor 205, responsive to determining that a video stream includes an image of the relevant participant, augments the video stream to include a highlighted image of the relevant participant. For example, the electronic processor 205 may augment the video stream by overlaying an outline onto the image of the relevant participant. FIG. 5 illustrates a still image 500, which includes several outlined participants 502. As illustrated in FIG. 5, in some embodiments, the outlines include text identifying the talkgroup to which the participant belongs.

Figure 6:
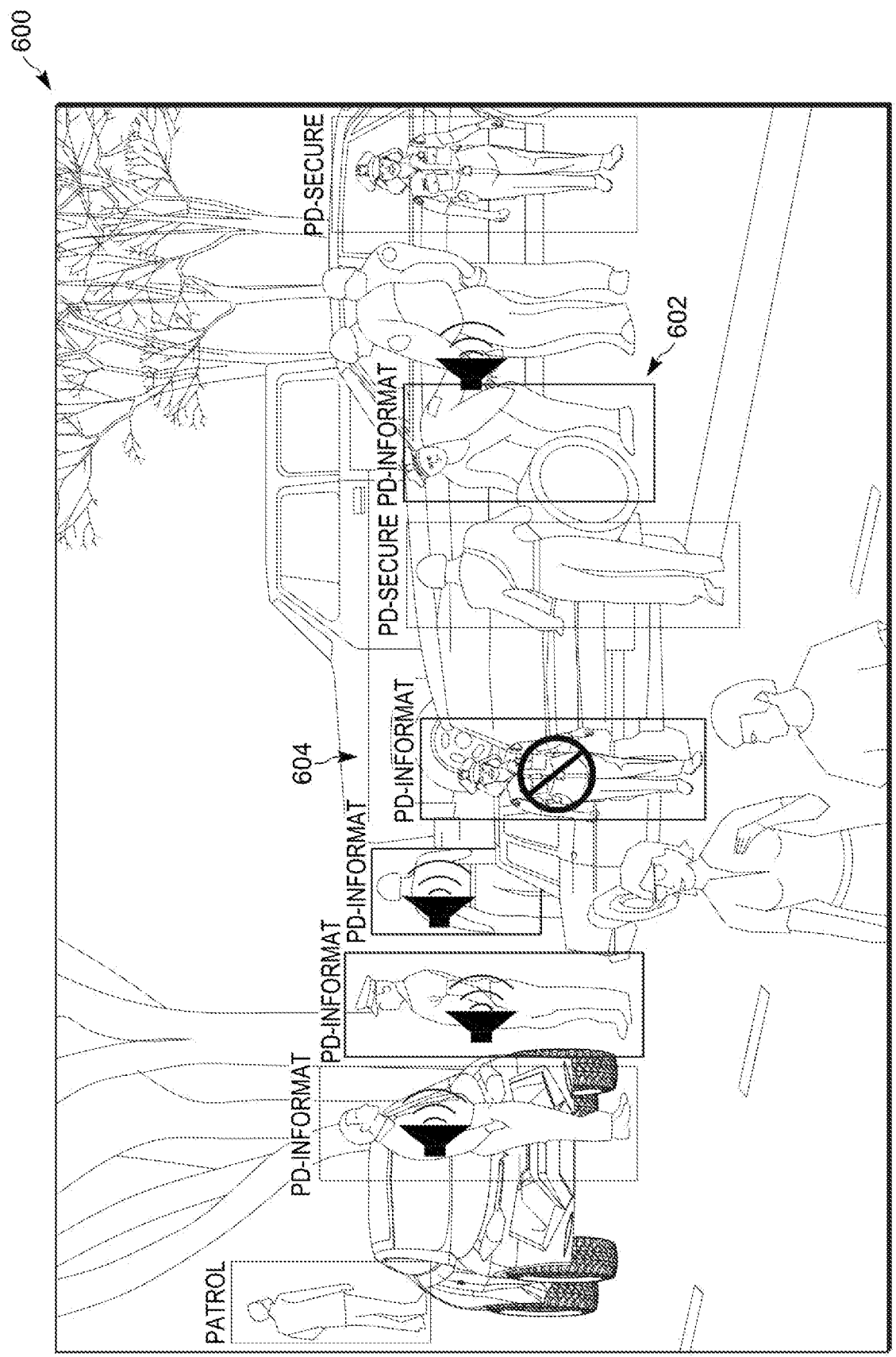
FIG. 6 is a diagram illustrating aspects of the operation of the method of FIG. 4 in accordance with some embodiments.

In some embodiments, as illustrated in the still image 600 of FIG. 6, the video stream is augmented by superimposing contextually relevant information onto the image of the relevant participant. Contextually relevant information includes one or more of a participant identifier, a participant role, a participant status, a battery status, and a radio status. For example, as illustrated in FIG. 6, the radio status 602 indicates that the speaker is operating, while the radio status 604 indicates that the radio is muted.

Returning to FIG. 4, at block 414, the electronic processor 205, for each of the plurality of video streams, assigns a priority based on the highlighted image of the relevant participant and the context information. In some embodiments, the priority is a numerical value (for example, a decimal number, an integer, or a percentile) that indicates the importance of a video stream relative to other video streams that include images or one or more other relevant participants. For example, where two video streams are being compared, the one having the higher priority would be presented to a dispatcher before the one having the lower priority. In some embodiments the priority may be expressed as a range (for example, low, medium, or high).

In some embodiments, priorities are assigned using participant or call status as extracted from the context data, reported to the dispatch console, or both. For example, an emergency call status (for example, officer down) would be assigned a higher priority than non-emergency call status (for example, a request for traffic control). In some embodiments, priorities may be assigned based on the last call time (for example, more recently called/calling participants will be given a higher priority). In some embodiments, priorities are assigned based on a correlation between an incident handled by the dispatcher and engaged first responders in a resource group. In some embodiments, priorities are assigned based on the percentage of call statuses calls for participants in the same response role. For example, for the paramedic team, the percentage of their calls that were delivered. In some embodiments, the priority values assigned based on these factors can be configured per responding agency preferences.

In some embodiments, the factors contributing to the assigned priority values are weighted such that certain factors have a greater impact on the priority value. For example, call status may be assigned a higher weight than other factors so that an emergency call overrides all other factors.

When all of the plurality of video streams have been analyzed (at block 416), at block 418, the electronic processor 205 selects, based on the priorities assigned to each of the plurality of video streams, a video stream including the highlighted image of the relevant participant. For example, the electronic processor may select the video stream having the highest priority value. In some embodiments, the electronic processor 205 selects a video stream using a priority threshold. The priority threshold is a value used to determine whether a video stream that includes an image of the relevant participant should be selected for display. The value of the priority threshold is set to prevent the display of a video stream for a newly-relevant participant when a video stream including another relevant participant, which has a higher priority, is being displayed. In some embodiments, the priority threshold is an absolute threshold, which must be met before a video stream is selected. For example, a video stream must have a priority of at least 0.6 on a 1-point scale in order to be displayed. In another example, only video streams assigned a high priority on a low/medium/high scale result in the video streams being displayed. In some embodiments, the priority threshold is a relative threshold. For example, a video stream must have a priority that exceeds the average priority of all video streams by a particular amount in order to be displayed. In some embodiments, a video stream must have a priority that meets or exceeds the average priority of the video streams displayed within a recent time window in order to be displayed. For example, the electronic processor 205 may keep a rolling average of the priorities of all video streams and compare the priority of the current video stream to the rolling average to determine whether or not to display it.

In some embodiments, the electronic processor 205, based on the priority assigned to one of the plurality of video streams, transmits a control command to adjust the field of view of the video stream. For example, the electronic processor 205 may determine that it would be possible to get a better view of a relevant participant from a different video stream, and may issue a command to the video source of the stream to adjust its field of view to an angle that would better capture an image of the relevant participant.

At block 420, the electronic processor 205 presents the selected video stream on the display. For example, the server 102 may issue a command to the dispatch console 106 to present the selected video stream in a highlighted window.

In some instances, many relevant participants are present in a single frame, and augmenting the video stream would make it difficult for the dispatcher to understand the data presented. In some embodiments, when displaying information per relevant participant is not feasible, the server 102 will group highlight participants and present the data for each group. For example, FIG. 7 includes a still image 700, which is an image of a group of first responders, which includes participants for two talkgroups. Because augmenting each participant with data would result in an image that is difficult to read, the server 102 spits the group into two subgroups of participants (subgroup 702 and subgroup 704), which are each outlined. To display which participants have received messages, subgroup 702 is augmented with a double donut chart 706 and subgroup 704 is augmented with a double donut chart 708. As shown in the key 710, each chart is divided into parts, one for each talkgroup, with each part representing the percentage of participants, which have received or not received messages. To view details regarding each subgroup's participants, a dispatcher can click on the associated donut chart to get details about participants in each of the subgroups.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for indicating call status for relevant dispatch call participants, the system comprising:
   a display;
   a transceiver; and
   an electronic processor communicatively coupled to the display and the transceiver, and configured to
   receive, via the transceiver, a voice communication associated with a talkgroup, the talkgroup having a plurality of participants;
   determine, from the voice communication, context information for the plurality of participants, wherein the context information includes dispatch console context and participant status indicating engagement and safety in incident response;
   select, based on the context information, a relevant participant for the talkgroup from the plurality of participants, wherein the relevant participant is selected based on circumstances indicating they may not be reliably receiving radio transmissions;
   receive, via the transceiver, a plurality of video streams, wherein at least one of the plurality of video streams includes an image of one or more of the plurality of participants, wherein the plurality of video streams are from devices carried or operated by first responders at an incident scene;
   for each of the plurality of video streams, responsive to determining that the video stream includes an image of the relevant participant, augment the video stream to include a highlighted image of the relevant participant, wherein the augmentation includes overlaying outlines and superimposing specific contextual information;
   for each of the plurality of video streams, assign a priority based on the highlighted image of the relevant participant and the context information, wherein the priority is assigned as a numerical value indicating relative importance;
   select, based on the priorities assigned to each of the plurality of video streams, a video stream including the highlighted image of the relevant participant; and
   present the video stream on the display.

2. The system of claim 1, wherein the context information includes at least one selected from the group consisting of a current dispatch console context, a status for at least one of the plurality of participants, an incident identifier, an incident type, and a current talkburst level.

3. The system of claim 1, wherein the electronic processor is configured to augment the video stream to include a highlighted image of the relevant participant by overlaying an outline onto the image of the relevant participant.

4. The system of claim 3, wherein the electronic processor is configured to augment the video stream to include a highlighted image of the relevant participant by superimposing contextually relevant information onto the image of the relevant participant.

5. The system of claim 4, wherein the contextually relevant information includes at least one selected from the group consisting of a participant identifier, a participant role, a participant status, a battery status, and a radio status.

6. The system of claim 1, wherein the electronic processor is configured to, based on the priority assigned to one of the plurality of video streams, transmit, via the transceiver, a control command to adjust a field of view of the video stream.

7. The system of claim 1, further comprising:
   a memory;
   wherein the electronic processor is communicatively coupled to the memory, and configured to
   perform text transcription of the voice communication to generate text corresponding to the voice communication;
   store the text corresponding to the voice communication in the memory; and
   perform natural language processing on the text to determine the context information for the plurality of participants.

8. The system of claim 3, wherein the electronic processor is configured to, for each of the plurality of video streams, determine whether the video stream includes an image of the relevant participant using an object classifier.

9. The system of claim 1, wherein the electronic processor is further configured to determine a cognitive load for at least one of the plurality of participants; and select the relevant participant for the talkgroup from the plurality of participants based further on the cognitive load for the at least one of the plurality of participants.

10. A method for indicating call status for relevant dispatch call participants, the method comprising:

receiving, via a transceiver, a voice communication associated with a talkgroup, the talkgroup having a plurality of participants;

determining, with an electronic processor, context information for the plurality of participants from the voice communication, wherein the context information includes dispatch console context and participant status indicating engagement and safety in incident response;

selecting a relevant participant for the talkgroup from the plurality of participants based on the context information, wherein the relevant participant is selected based on circumstances indicating they may not be reliably receiving radio transmissions;

receiving, via the transceiver, a plurality of video streams, wherein at least one of the plurality of video streams includes an image of one or more of the plurality of participants, wherein the plurality of video streams are from devices carried or operated by first responders at an incident scene;

for each of the plurality of video streams, responsive to determining that the video stream includes an image of the relevant participant, augmenting the video stream to include a highlighted image of the relevant participant, wherein the augmentation includes overlaying outlines and superimposing specific contextual information;

for each of the plurality of video streams, assigning, with the electronic processor, a priority based on the highlighted image of the relevant participant and the context information, wherein the priority is assigned as a numerical value indicating relative importance;

selecting, a video stream including the highlighted image of the relevant participant based on the priorities assigned to each of the plurality of video streams; and presenting the video stream on a display.

11. The method of claim 10, wherein determining context information includes determining at least one selected from the group consisting of a current dispatch console context, a status for at least one of the plurality of participants, an incident identifier, an incident type, and a current talkburst level.

12. The method of claim 10, wherein augmenting the video stream to include a highlighted image of the relevant participant includes overlaying an outline onto the image of the relevant participant.

13. The method of claim 12, wherein augmenting the video stream to include a highlighted image of the relevant participant includes superimposing contextually relevant information onto the image of the relevant participant.

14. The method of claim 13, wherein superimposing contextually relevant information includes superimposing at least one selected from the group consisting of a participant identifier, a participant role, a participant status, a battery status, and a radio status.

15. The method of claim 10, further comprising:

transmitting, via the transceiver, a control command to adjust a field of view of the video stream based on the priority assigned to one of the plurality of video streams.

16. The method of claim 10, further comprising:

performing text transcription of the voice communication to generate text corresponding to the voice communication; and storing the text corresponding to the voice communication in a memory;

wherein determining the context information for the plurality of participants includes performing natural language processing on the text stored in the memory.

17. The method of claim 10, further comprising:

for each of the plurality of video streams, determining whether the video stream includes an image of the relevant participant using an object classifier.

18. The method of claim 10, further comprising:

determining a cognitive load for at least one of the plurality of participants; and selecting the relevant participant for the talkgroup from the plurality of participants based further on the cognitive load for the at least one of the plurality of participants.

* * * * *